United States Patent [19]

Schmitt et al.

[11] Patent Number: 4,648,661
[45] Date of Patent: Mar. 10, 1987

[54] EMPTY AND LOAD VALVE FOR A RAILROAD CAR BRAKE SYSTEM

[75] Inventors: Eugene W. Schmitt, Lockport; Robert E. Campbell, Arlington Heights, both of Ill.

[73] Assignee: Sloan Valve Company, Franklin Park, Ill.

[21] Appl. No.: 745,784

[22] Filed: Jun. 17, 1985

[51] Int. Cl.[4] ............................................. B60T 8/20
[52] U.S. Cl. ................................. 303/23 R; 188/195; 303/6 R
[58] Field of Search ............... 303/23 R, 22 R, 23 A, 303/23 GC, 23 GR; 188/195

[56] References Cited

U.S. PATENT DOCUMENTS

| | | | |
|---|---|---|---|
| 3,338,640 | 8/1967 | Kirk | 303/23 R |
| 3,612,230 | 10/1971 | Ludington et al. | 303/23 R X |
| 3,780,837 | 12/1973 | Haydu | 188/195 |
| 4,291,923 | 9/1981 | Billeter | 303/23 R |

Primary Examiner—Duane A. Reger
Assistant Examiner—Matthew C. Graham
Attorney, Agent, or Firm—Kinzer, Plyer, Dorn & McEachran

[57] ABSTRACT

An empty and load valve for a railroad car brake system is mounted on the bolster of a truck and has a sensing arm engageable with a side frame of the truck. An empty and load device is mounted on each intermediate truck of an articulated car. The device has a valve body with a manifold and an equalizing reservoir attached thereto. A first air passage extends through the valve body and a second air passage extends in the valve body from the first air passage to the equalizing reservoir. A piston assembly is reciprocable in the first air passage to open and close the passage and thereby proportion the available air supply. A plunger is movable in the valve body in response to the sensing arm to disable the piston assembly when a loaded condition is sensed. The plunger also allows a valve in the second air passage to close when a loaded condition is sensed so that all of the available air supply is supplied to the brake actuator.

4 Claims, 7 Drawing Figures

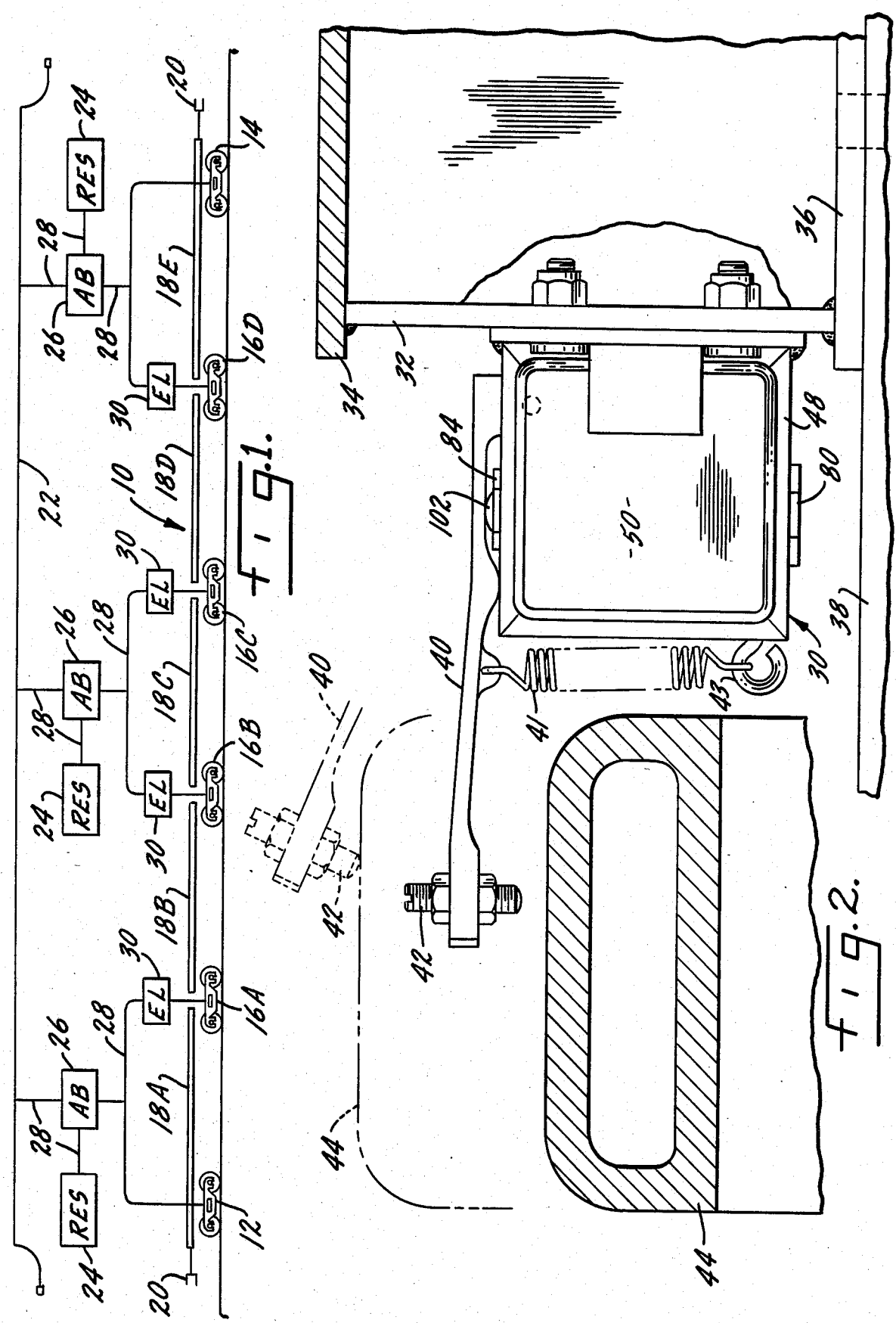

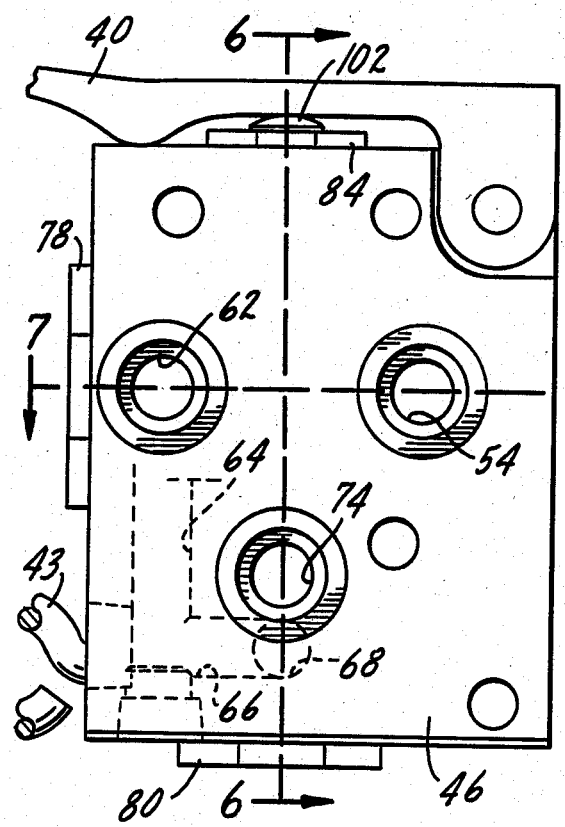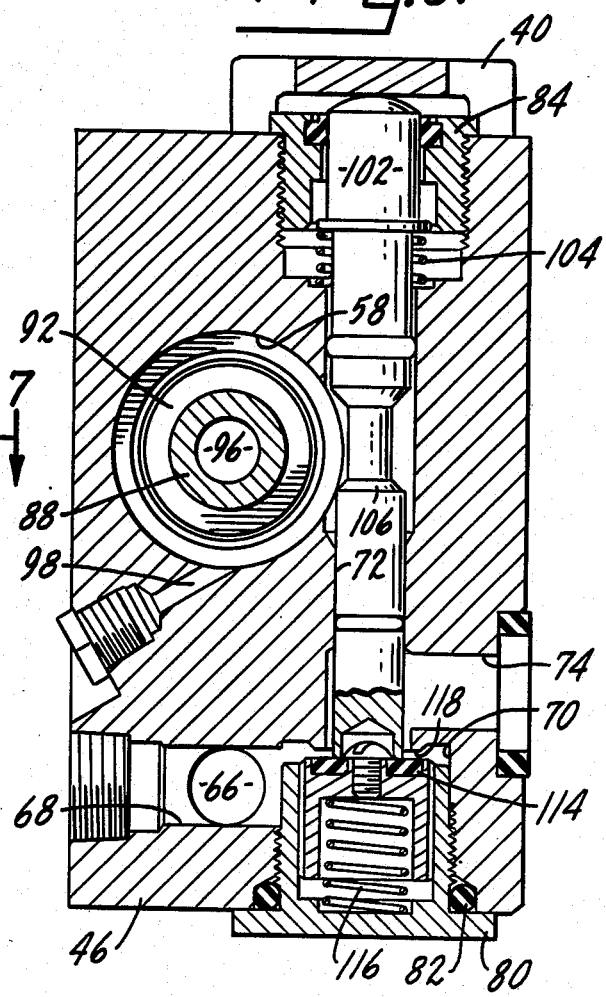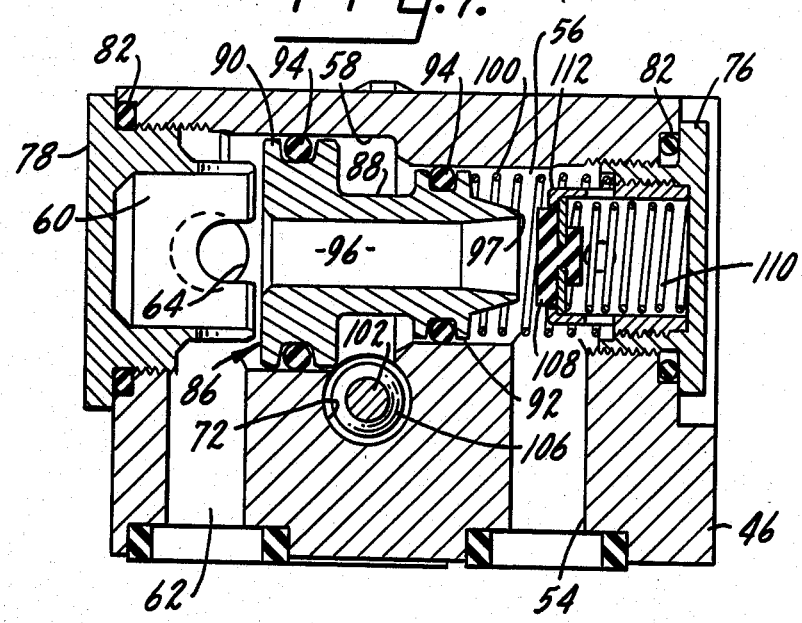

4,648,661

EMPTY AND LOAD VALVE FOR A RAILROAD CAR BRAKE SYSTEM

SUMMARY OF THE INVENTION

This invention relates to railroad car brakes and is specifically directed to an empty and load valve.

A primary object of the invention is an empty and load valve which mounts directly to the freight car truck bolster, preferably between the side bearing and the side frame.

Another object of the invention is an empty and load valve which measures the load deflection for each truck and adjusts the brakes on that truck only.

Another object of the invention is an empty and load device for articulated container cars where the platforms of the car may be mixed loaded with the car operating with a full load on one truck and an empty load on another truck.

A further object of the invention is an empty and load valve which measures the load on each truck individually and does not affect the performance of brakes on other trucks.

A further object of the invention is an empty and load valve having a simple construction which is easy to assemble.

Other objects may appear in the following specification, drawings and claims.

BRIEF DESCRIPTION OF THE DRAWINGS

FIG. 1 is a schematic elevation view of an articulated car and its brake system.

FIG. 2 is an end elevation view of a portion of a car truck, showing the mounting of the empty and load valve of the present invention and its relation to the truck parts.

FIG. 5 is a view, on an enlarged scale, taken along line 5—5 of FIG. 4.

FIG. 6 is a section on an enlarged scale taken along line 6—6 of FIG. 5.

FIG. 7 is a section on an enlarged scale taken along line 7—7 of FIG. 5.

DETAILED DESCRIPTION OF THE INVENTION

Figure 3:
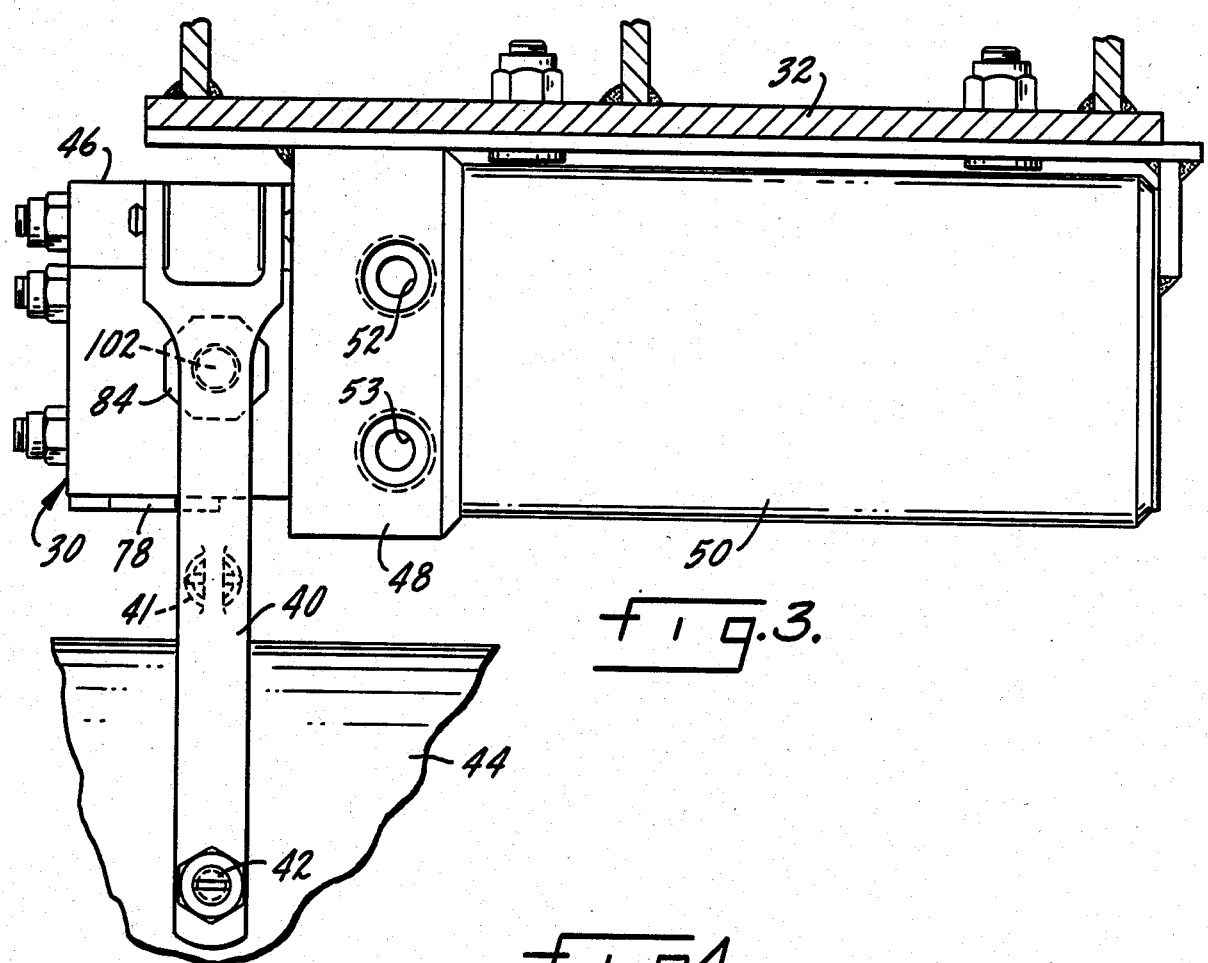
FIG. 3 is a plan view of the empty and load valve.

FIG. 1 illustrates an articulated container car 10 having end trucks 12 and 14 and intermediate trucks 16A-D. While not shown in detail, the trucks are of conventional construction having wheel and axle sets mounted in bearings carried by side frames which are connected by a bolster. A brake beam (not shown) is associated with each set of wheels and is pivotally connected to the side frames. The car has a plurality of platforms 18A-E which are pivotally connected at either end to one of the trucks. Couplers 20 are provided at the ends of the car.

The particular car illustrated has five platforms and a total of six trucks. Given this arrangement, it is convenient, although not necessary, to have three separate sets of brakes for the car. As seen in FIG. 1, a first set operates the brakes on end truck 12 and the first intermediate truck 16A, a second brake set operates the brakes on the two middle intermediate trucks 16B and 16C, while the third brake set operates on intermediate truck 16D and end truck 14. The brake system includes the usual train line 22. Each brake set includes a reservoir 24, a conventional ABDW control valve 26 and appropriate air lines 28. Also, each truck has actuating means thereon for operating the brakes on that truck. The actuating means may be a conventional cylinder or an air actuator. Further details of the truckmounted brake rigging and appropriate actuators are shown and described in U.S. Application Ser. No. 698,141, filed Feb. 4, 1985 and assigned to the present assignee. The disclosure of that application is incorporated by reference. While the invention is shown and described in connection with an articulated car, it is not necessarily limited thereto. Also, the valve of the present invention could be used to control a body-mounted brake rigging, as well as the truck-mounted rigging shown.

An empty and load valve 30 of the present invention is located in air line 28 between the actuators on the intermediate trucks 16 and the control valves 26. Details of the empty and load valve mounting are shown in FIG. 2. The valve 30 is bolted to a vertical side bearing support plate 32. This plate is welded to upper and lower side bearing support plates 34 and 36, respectively. The lower side bearing support plate is fixed to the top of the bolster 38. The empty and load valve has a sensing arm 40 pivotally connected thereto. A spring 41 connected to the arm 40 and a hook 43 biases the arm toward the valve 30. At the end of the sensing arm is an adjustable bolt 42. The bolt 42 is engageable with a side frame 44. When the platforms connected to the truck are in a loaded condition, the bolster will drop or sink relative to the side frame such that the side frame will contact the sensing arm bolt 42 and raise the sensing arm as shown in phantom lines in FIG. 2. The importance of this will be discussed below.

Figure 4:
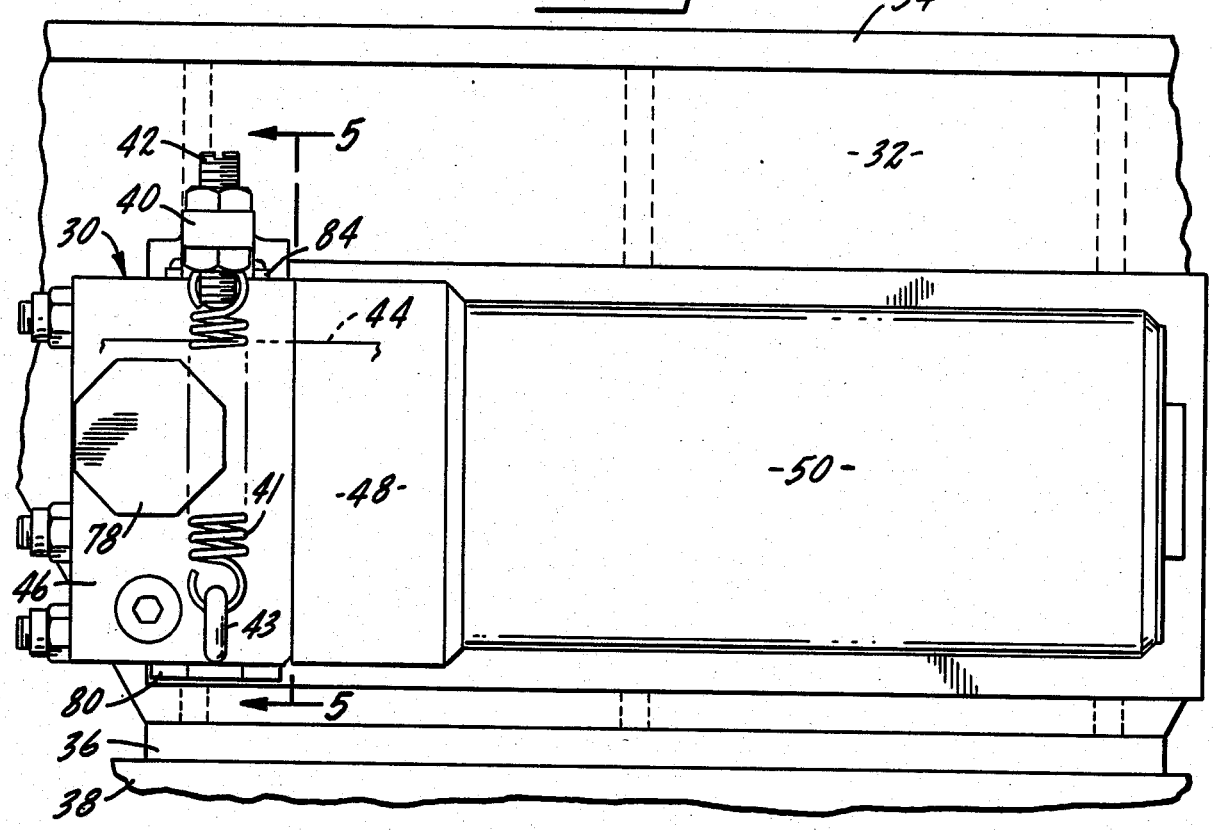
FIG. 4 is a side elevation view of the empty and load valve.

FIGS. 3 and 4 show further details of the empty and load valve 30. The valve includes a valve body 46 connected to a manifold 48 which in turn mounts an equalizing reservoir 50. The manifold has an inlet port 52 (FIG. 3) for air coming from the control valve 26. Another port 53 is an outlet for the air lines supplying the actuating means on the truck. The manifold 48 has internal passages (not shown) for connecting the ports 52 and 53 to the valve body 46 and for connecting passages in the valve body to the equalizing reservoir 50.

The empty and load valve body 46 is shown in detail in FIGS. 5-7. The valve has a first air passage defined by inlet 54, entry chamber 56, central chamber 58, exit chamber 60 and outlet 62. The inlet 54 and outlet 62 mate with passages in the manifold 48 which in turn connect to the ports 52 and 53. Air enters the inlet 54 from the reservoir 24 and control valve 26, via the port 52 and manifold 48. Air exiting through outlet 62 goes through the manifold 48 to the port 53 and from there to the cylinder or air actuator on the truck.

A second air passage is defined by interior passages 64, 66, 68 and chamber 70, bore 72 and outlet 74. The outlet 74 connects to a passage in the manifold communicating with the equalizing reservoir 50. The bore 72 extends vertically through the entire valve body 46.

Several of the openings in the valve body are closed off by caps threaded into the body. The entry chamber 56 is closed by a cap 76. Similarly, the exit chamber 60 is closed by cap 78 while chamber 70 is closed by cap 80. These three caps include seals 82. A fourth cap 84 fits in the upper end of bore 72.

A piston assembly is shown generally at 86 in Fig. 7. The piston assembly has a hollow shaft 88 mounting a large piston 90 and a small piston 92. The pistons include seals 94 engaging the walls of the first passage. An opening 96 extends through the piston shaft, providing fluid communication from the entry chamber 56 to the exit chamber 60. The piston opening 96 extends to a valve seat 97 at the right hand end as seen in FIG. 7. The seals 94 isolate the central chamber 58 from the entry and exit chambers. A vent passage 98 (FIG. 6) vents the central chamber 58 to atmosphere. A spring 100 in the entry chamber 56 is compressed between the cap 76 and the small piston 92, thereby urging the piston assembly 86 to the left in FIG. 7.

A plunger 102 is disposed in the bore 72. The plunger is urged upwardly by a spring 104, into engagement with the sensing arm 40. When the car is empty, the spring 41 pulls the sensing arm down, thereby pushing the plunger 102 down to the position shown in FIGS. 5 and 6. The plunger has a shoulder 106 which is engageable with the large piston 90 under circumstances to be described below.

The valve structure is completed by a pair of poppet valves. A poppet valve 108 is biased by spring 110 against sleeve 112 which is threaded into the cap 76. A second poppet valve 114 fits in the cap 80 and is biased by spring 116 against a valve seat 118 at the intersection between chamber 70 and bore 72.

The use, operation and function of the invention are as follows.

The brake system of FIG. 1 is arranged such that each empty and load valve 30 operates independently and can adjust the brake force applied at each of the intermediate trucks 16, also independently of the other trucks of the car. The advantage of this arrangement is that it allows application of a greater brake force to trucks bearing a heavy load than is applied to lightly loaded trucks. For example, platforms 18A and 18B may have containers thereon, in which case a full brake force needs to be applied at truck 16A. At the same time, however, platforms 18D and 18E may be empty, in which case the brake force applied to intermediate truck 16D needs to be reduced in order to prevent locking up the wheels and sliding them along the track. The present invention accomplishes this in the following manner.

When a platform is empty, the bolster on which it rests will be relatively high compared to the truck side frames. This is the condition shown in FIG. 2. The spring 41 pulls the sensing arm 40 into contact with the plunger 102, pushing it down into the bore 72. The lower end of the plunger contacts poppet valve 114 and pushes it away from the valve seat 118. This provides fluid communication between the chamber 70, bore 72 and outlet 74. When the brakes are to be applied, the control valve 26 supplies air pressure from the reservoir 24 to the port 52 in the manifold 48. From there, air travels to the first air passage in the valve body 46. Air enters the inlet 54, entry chamber 56, piston opening 96, exit chamber 62 and outlet passage 62. From there, air goes through the manifold 48 to outlet port 53 and to the air actuator or cylinder which actuates the brake beams. Air also flows through the second air passage, specifically the openings 64, 66, 68, chamber 70, past the open poppet valve 114 into bore 72 and outlet 74. From the outlet 74, air travels through the manifold to the equalizing reservoir 50. The equalizing reservoir provides an additional volume in the brake system which permits a pressure drop so that less than full available pressure is applied to the actuating means.

Further, as pressure builds in the exit chamber 60, the piston assembly 86 is urged to the right (in FIG. 7) due tb the greater area of the large piston 90 as compared to the small piston 92. This movement to the right forces the valve seat 97 against poppet valve 108, thereby closing off the first air passage. The continued buildup of air pressure in entry chamber 56 overcomes the force to the right due to the piston area differential, forcing the piston assembly to the left and reopening the piston opening 96. When the pressure equalizes in the entry and exit chambers, the piston will again close against the poppet valve. This process continues, producing an oscillating motion of the piston, rapidly opening and closing the first air passage. The result is a proportionate reduction in the air flow through the first air passage so that a reduced brake force is applied by the actuating means.

When the platforms on a particular truck are loaded, the bolster sinks relative to the side frame. This causes the sensing arm 40 to be lifted as shown in phantom in FIG. 2. Lifting of the sensing arm allows the plunger 102 to rise in the bore 72, under the influence of spring 104. This plunger motion brings the shoulder 106 into contact with the large piston 90, thereby interfering with the oscillating motion of the piston assembly. The piston assembly is prevented from moving to the right and contacting the poppet 108. So the first air passage remains open. Also, when the plunger 102 rises, it no longer pushes the poppet 114 away from seat 118. The poppet closes against the seat, thereby cutting off air flow through the second air passage to the equalizing reservoir. With the second air passage closed and the first air passage always open, the full air supply from the main reservoir 24 is supplied to the actuating means through the first air passage. Full braking force is applied to the brake system.

Whereas a particular form of the invention has been shown and described, it will be understood that modifications could be made thereto without departing from the scope of the following claims.

We claim:

1. An empty and load valve for a railroad car brake system that includes a control valve and an air actuating means comprising a valve body, an equalizing reservoir connected to the body, an air inlet in the body adapted to be connected to the control valve and an air outlet adapted to be connected to the air actuating means, a first air passage between said inlet and outlet, a piston assembly reciprocal in said first air passage to alternately open and close said first air passage and thereby proportion the air from the control valve to the air actuating means, a sending arm attached to the valve body, a plunger movable in the valve body in response to the sensing arm and positioned for contact with said piston assembly to prevent movement thereof to close said first air passage during car loaded conditions, a second air passage in said body extending between said first air passage and said reservoir, normally closed valve means in said second air passage, said plunger being positioned to open said normally closed valve means during other than loaded car conditions to connect said reservoir with said air inlet.

2. The structure of claim 1 wherein the piston assembly includes a hollow shaft mounting a large piston and a small piston in sealing engagement with the first passage, said first air passage having an air inlet, the small piston being disposed closer to the air inlet of the first passage.

3. The structure of claim 2 further comprising a poppet valve in the first air passage, engageable with the piston assembly to close off the hollow shaft when the piston assembly moves into engagement with the poppet valve.

4. The structure of claim 2 further characterized in that said plunger contacts said large piston to prevent movement of said proportioning piston assembly.

* * * * *